J. F. Light,
Shaft Coupling.

Nº 60,912.        Patented Jan. 1, 1867.

Witnesses.
Thos. H. Dodge.
D. L. Miller.

Inventor.
J. F. Light.

United States Patent Office.

J. F. LIGHT, OF WORCESTER, MASSACHUSETTS.

Letters Patent No. 60,912, dated January 1, 1867.

IMPROVED SHAFT COUPLING.

*The Schedule referred to in these Letters Patent and making part of the same.*

TO ALL WHOM IT MAY CONCERN:

Be it known that I, J. F. LIGHT, of the city and county of Worcester, and Commonwealth of Massachusetts, have invented certain new and useful improvements in Couplings for Shafts, Pipes, Rods, and other similar purposes; and I do hereby declare that the following is a full, clear, and exact description of the same, reference being had to the accompanying drawings, forming a part of this specification, in which—

Figure 2:
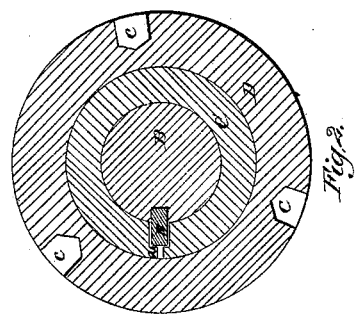
Figure 2 represents a cross-section on line C D, fig. 1.
Figure 3:
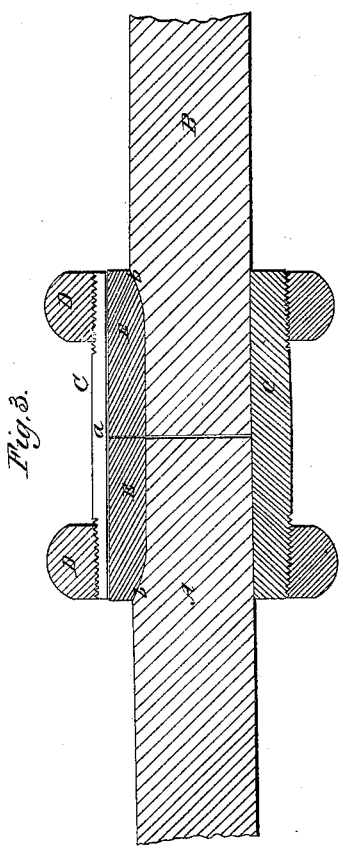
Figure 3 represents a longitudinal central section on line A B, fig. 1.
Figure 1:
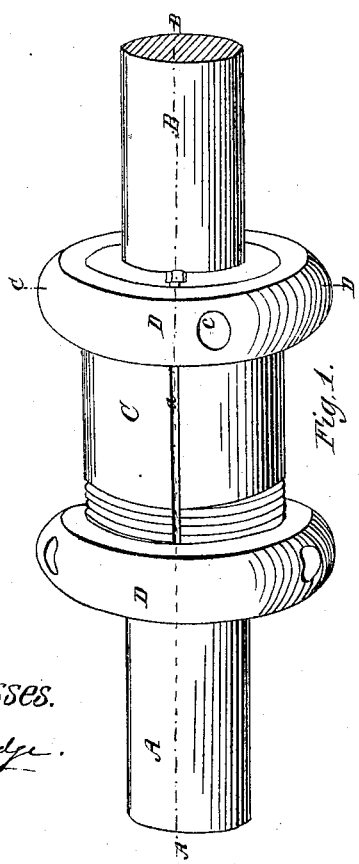
Figure 1 represents a perspective view of my improved coupling applied to couple the ends of two shafts A and B, so much of the shafts being shown as is necessary to illustrate my invention.

To enable others skilled in the art to which my invention belongs to make and use the same, I will proceed to describe it.

In the drawings, A and B represent the ends of two shafts to be coupled. They are cut or slotted out to receive splines E, the slots being curved up, as seen at $b\,b$, as a matter of convenience in cutting. C represents the main coupling piece. It is first made in the form of a cylinder, and the inside bored or rimmed to the size of the shaft to be coupled. Each end of the coupling piece C is then turned slightly tapering and a screw-thread cut thereon. A slot is then cut upon its inside, of a width a little greater than the width of the slot in the shafts to be coupled. The coupling piece C being all finished, both inside and out, a narrow slit, $a$, is cut lengthwise through the side, as indicated in the drawings. Two tightening nuts, D, are made, with threads to fit the threads upon the ends of the coupling piece C, the hole in the nuts being made a little tapering to correspond with the tapering ends of the coupling piece C. Nuts D have small holes, $e$, bored in their peripheries for the convenience of turning them up to tighten the coupling C.

The operation is as follows: Coupling piece C is slipped or placed upon the end of one of the shafts to be coupled, when the end of the other shaft is brought into line, when coupling piece C is slipped over the ends of both shafts and their splines E, as indicated in the drawings. Nuts D are now turned up, thereby closing the sleeve or coupling piece C upon the ends of both shafts in such a vise-like manner that one shaft cannot turn without the other. The slot for the splines in the sleeve or coupling C is cut large enough so as not to interfere with the proper action of the sleeve or coupling piece C upon the ends of the shaft, even if the diameter of the shafts happens to be smaller than the hole in the sleeve or coupling piece C. The coupling may be made, too, so as to couple the ends of shafts of different sizes. The hole in one end of the sleeve may be smaller or larger than what it is in the other, to suit the size of the shaft to be coupled. In cases where shafts are coupled which vary much in size, the outer surface of one end of the coupling C might be made smaller, if desired, to save metal and make the coupling lighter. The coupling can be made cheap, and is not liable to get out of order, and can be applied very quickly. The groove or slot upon the inside of the sleeve or coupling C is cut so that the sleeve can expand and be compressed without affecting the spline. All hammering is dispensed with, both in putting them on and taking them off. Shafting can be put up and taken down with much more ease than with the couplings now in use, and there is much less liability of getting the shaft up out of line. In some cases a spline may not be required, although it may be well to use one in most cases. The clasping power of the friction sleeve or coupling C is very great. In case the sleeve C is found too stiff, a slight groove planed in the back will obviate the difficulty.

Having described my improved coupling for the ends of shafts, rods, and other similar purposes, what I claim therein as new and of my invention, and desire to secure by Letters Patent, is—

The combination with the ends of two shafts or rods of a friction coupling piece C, tightening nuts D, and spline or splines E, substantially as set forth.

J. F. LIGHT.

Witnesses:
  THOS. H. DODGE,
  D. L. MILLER.